United States Patent [19]
Erbes

[11] Patent Number: 5,621,778
[45] Date of Patent: Apr. 15, 1997

[54] SHROUD RESTRAINT STABILIZER

[75] Inventor: John G. Erbes, Mt. View, Calif.

[73] Assignee: General Electric Company, San Jose, Calif.

[21] Appl. No.: 245,947

[22] Filed: May 19, 1994

[51] Int. Cl.⁶ .................................................. G21C 19/00
[52] U.S. Cl. ........................................... 376/302; 376/285
[58] Field of Search ..................................... 376/260, 285, 376/287, 294, 302, 461

[56] References Cited

U.S. PATENT DOCUMENTS

| | | | |
|---|---|---|---|
| 3,850,795 | 11/1974 | Thome | 376/302 |
| 4,379,119 | 4/1983 | Fujimoto | 376/302 |
| 5,392,322 | 2/1995 | Whitling et al. | 376/302 |
| 5,402,570 | 4/1995 | Weems et al. | 29/402.15 |
| 5,430,779 | 7/1995 | Baversten et al. | 376/302 |

OTHER PUBLICATIONS

GE Proposal No. 894–1D7DM–EK1, Revision 1, Core Spray Line Crack Repair, Dec. 9, 1993.
Shroud Repair, Description of Alternatives, Alan N. Baker, Mar. 1994.
Apr. 22, 1994 letter from Al Kozusko & Thomas Sliva of AEA O'Donnell, Inc. to Victor Bain of General Electric Company with annexed Description, facsimile cover sheet and drawings.
Presentation No. 94–004 dated May 2, 1994, by Welding Services Inc. and Structural Integrity Associates, Inc.

*Primary Examiner*—Daniel D. Wasil
*Attorney, Agent, or Firm*—James E. McGinness

[57] ABSTRACT

A method and an apparatus for stabilizing a shroud against lateral deflection. The shroud restraint stabilizer has springs which exert radially inwardly directed forces that resist lateral deflection of the shroud relative to the reactor pressure vessel. Each stabilizer includes a stabilizer preload spring and a seismic restraint spring. Each spring has resilient arms integrally connected to opposing ends of a common main support span. The resilient arms of the stabilizer preload spring form a first leaf spring of relatively lower stiffness and the resilient arms of the seismic restraint spring form a second leaf spring of relatively higher stiffness. The different stiffnesses are achieved by providing the first leaf spring with a longer base than that of the second leaf spring. The pads on the seismic restraint spring are in contact with the reactor pressure vessel, but are not preloaded under operating conditions. The seismic restraint spring is loaded in response to lateral deflection of the shroud, e.g., during a seismic event. During normal operation, the spring force exerted by the stabilizer preload spring provides restraint support for a shroud with cracked girth welds, thereby reducing new loads that tend to accelerate crack propagation.

18 Claims, 4 Drawing Sheets

# SHROUD RESTRAINT STABILIZER

FIELD OF THE INVENTION

This invention relates to the design of nuclear reactors able to safely withstand the loads and motions produced during an earthquake. In particular, the invention relates to techniques for stabilizing the core shroud of a nuclear reactor to resist lateral deflection in response to a seismic event.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder surrounding the core 20, which is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Core upper plenum 26 provides standoff between the steam-water mixture exiting core 20 and entering vertical standpipes 30. The standpipes are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers. The jet pump assemblies are circumferentially distributed around the core shroud 18.

The core shroud 18 (see FIG. 2) comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical middle shroud wall 18d having a top end welded to top guide support ring 18c; and an annular core plate support ring 18e welded to the bottom end of middle shroud wall 18d and to the top end of a lower shroud wall 18f. The diameter of upper shroud wall 18b is greater than the diameter of middle shroud wall 18d, which is in turn greater than the diameter of the lower shroud wall 18f. The entire shroud is supported by shroud support 51, which is welded to the bottom of lower shroud wall 18f, and by annular shroud support plate 52, which is welded at its inner diameter to shroud support 51 and at its outer diameter to RPV 10.

In the event of a seismic disturbance, it is conceivable that the ground motion will be translated into lateral deflection relative to the reactor pressure vessel of those portions of the shroud located at elevations above the shroud support plate 52. Such deflections would cause undesirable stresses on the shroud and its weldments. In particular, if the shroud weld zones have failed due to stress corrosion cracking, there is the risk of misalignment and damage to the core and the control rod components, which would adversely affect control rod insertion and safe shutdown.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

Stress corrosion cracking has been found in the top guide support ring of a BWR. The cracks in top guide support ring 18c extend radially inwardly from the outer circumferential surface thereof and radially outwardly from the inner circumferential surface thereof in the vicinity of the welds which join top guide support ring 18c to shroud walls 18b and 18d.

Stress corrosion cracking in top guide support ring 18c or any other heat affected zone of the shroud girth seam welds diminishes the structural integrity of shroud 18, which vertically and horizontally supports core top guide 19 and shroud head 28. Thus, there is a need for a method and an apparatus for stabilizing a core shroud which has cracks in the weld zones. In particular, there is a need to augment the lateral structural integrity of the shroud for the unlikely case where any of the shroud girth seam welds or heat affected zones thereof are assumed to have failed completely.

SUMMARY OF THE INVENTION

The present invention is a method and an apparatus for stabilizing a shroud against lateral deflection. The method involves the placement of a plurality of stabilizers in the downcomer annulus at respective azimuthal positions between jet pump assemblies. Preferably, one set of stabilizers is installed at the elevation of the top guide support ring, while another set of stabilizers is installed at the elevation of the core plate support ring.

Each stabilizer is resiliently wedged between the outer circumferential surface of the shroud wall and the inner circumferential surface of the RPV. The stabilizer has springs which exert radially inwardly directed forces that resist lateral deflection of the shroud relative to the RPV. In accordance with a preferred embodiment, each stabilizer comprises stabilizer preload spring and a seismic restraint spring. Each spring comprises resilient arms integrally connected to opposing ends of a common main support span. The resilient arms of the stabilizer preload spring form a first leaf spring of relatively lower stiffness and the resilient arms of the seismic restraint spring form a second leaf spring of relatively higher stiffness. The different stiffnesses are achieved by providing the first leaf spring with a longer base than that of the second leaf spring. Preferably, the first leaf spring comprises a pair of oppositely extending resilient arms and the second leaf spring comprises two pairs of oppositely extending resilient arms arranged on opposite sides of the arms of the first leaf spring.

Each leaf spring is provided with pads at opposing arm ends which bear against the RPV. The heights of the pads are selected such that the pads on the seismic restraint spring are in contact with the RPV, but are not preloaded under operating conditions. The seismic restraint spring is loaded in response to lateral deflection of the shroud, e.g., during a seismic event.

As a result of this novel construction, the dual-rate stabilizer spring assembly secures itself in place and accommodates operational deformations of the shroud annulus with low preloads. These operational deformations are due to both thermal expansion differentials and pressure. Thus, low operating loads are imposed on the shroud, vessel and spring. During normal operation, the spring force exerted by the stabilizer preload spring provides restraint support for a shroud with cracked girth welds, thereby reducing new loads that tend to accelerate crack propagation. The seismic restraint spring exerts a spring force only in opposition to being pressed against the RPV wall by a lateral deflection of the shroud, e.g., during an earthquake.

The shroud restraint stabilizer in accordance with the invention is designed to adjust to varying width of the downcomer annulus. The width is different at different locations and can vary over time at any one of those locations. The first variation is attributable to manufacturing tolerances; the second variation is attributable to differential expansion of the stainless steel shroud versus the low-alloy steel reactor pressure vessel under operating conditions. The stabilizer has a wedge which slidably engages a wedge support in a form-locking manner. The total radial dimension of the stabilizer assembly can be adjusted to span the annulus width with a desired preload by sliding the wedge relative to the wedge support and then locking it in place.

DETAILED DESCRIPTION OF THE PREFERRED EMBODIMENTS

The present invention is a method and an apparatus for stabilizing a shroud against lateral deflection. The apparatus is a shroud restraint stabilizer assembly 50 which is resiliently wedged between opposing surfaces of the core shroud and the reactor pressure vessel. Preferably, a first plurality of shroud restraint stabilizers 50 are installed at a corresponding plurality of azimuthal locations at the elevation of the top guide support ring 18c and a second plurality of shroud restraint stabilizers 50' are installed at a corresponding plurality of azimuthal locations at the elevation of the core plate support ring 18e (see FIG. 5).

Figure 1:
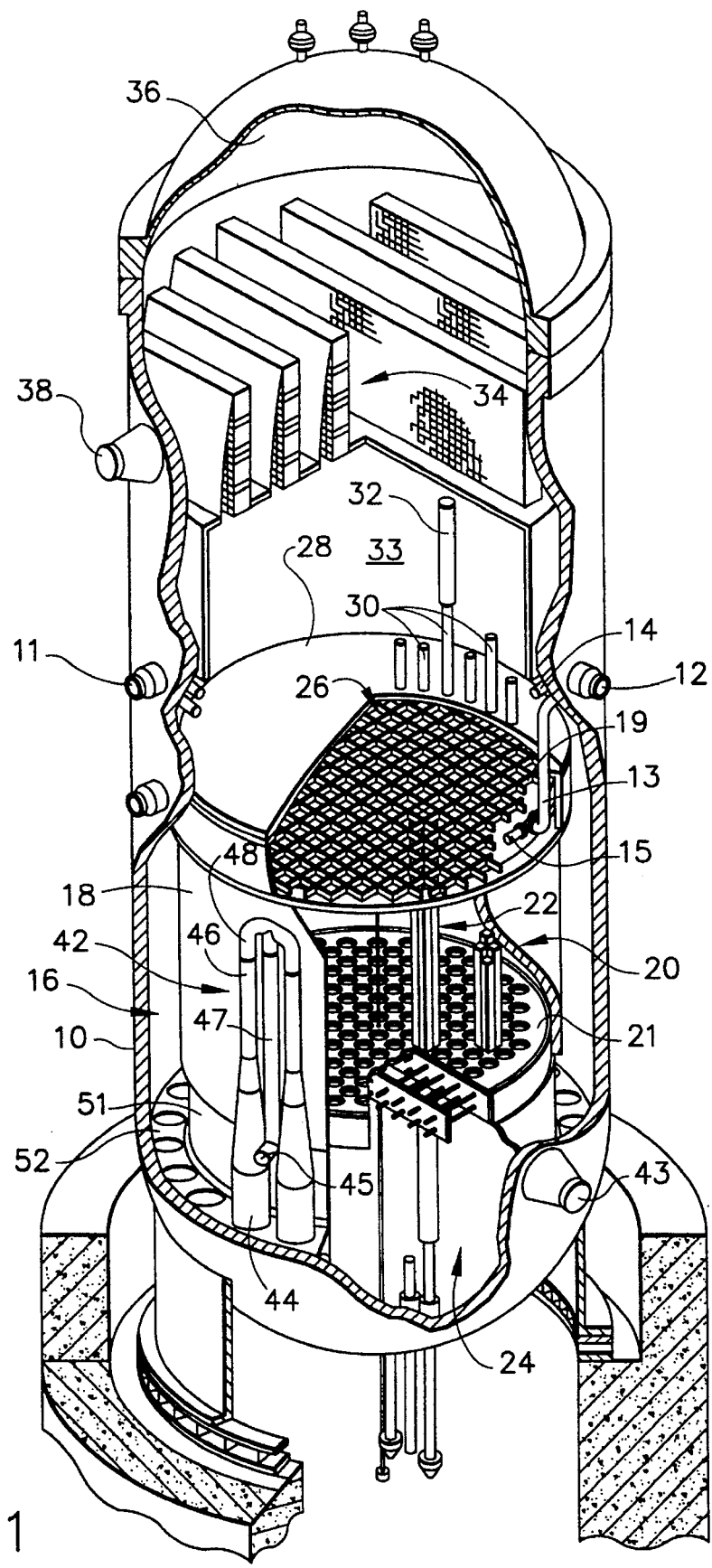
FIG. 1 is a schematic showing a partially cutaway perspective view of a conventional BWR.
Figure 2:
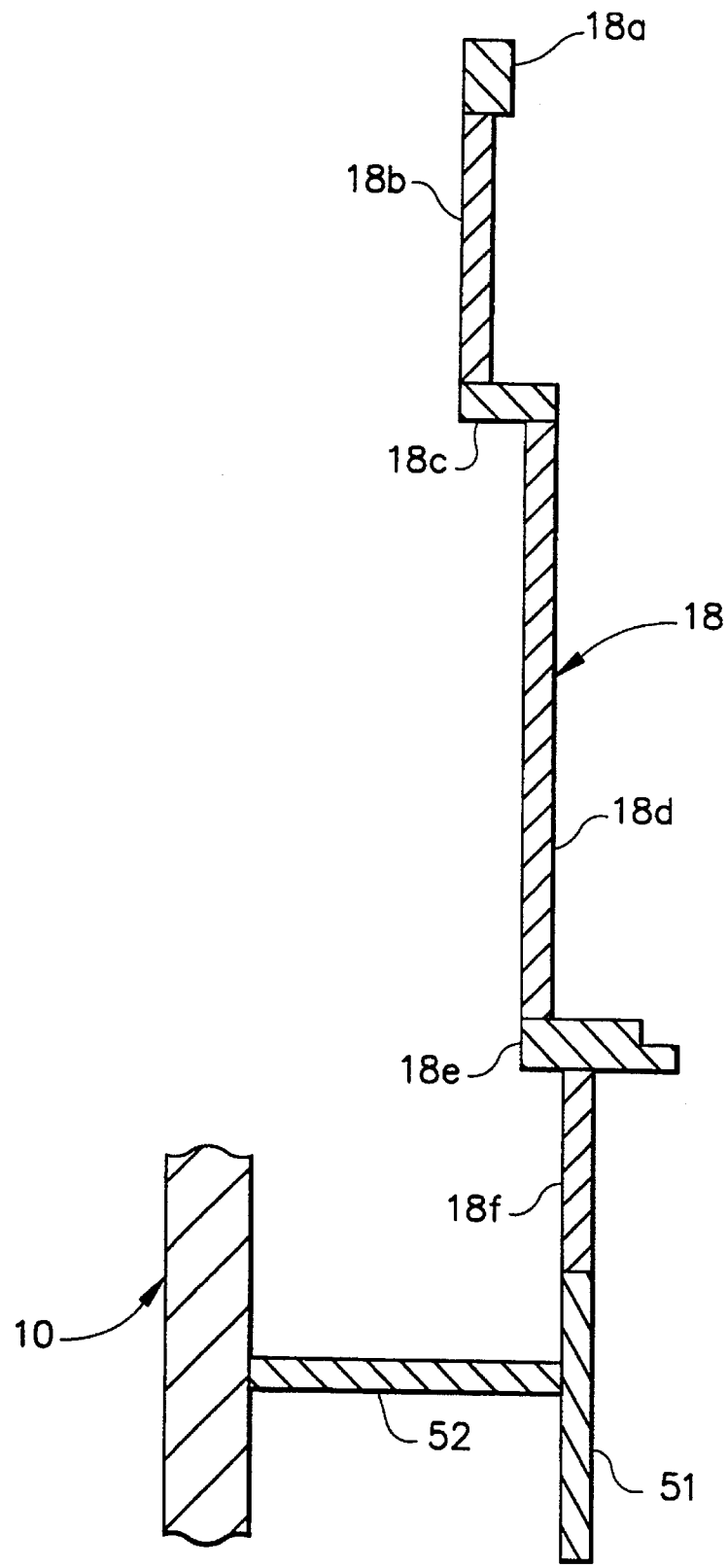
FIG. 2 is a sectional view of a portion of the core shroud of the BWR shown in FIG. 1.
Figure 3A:
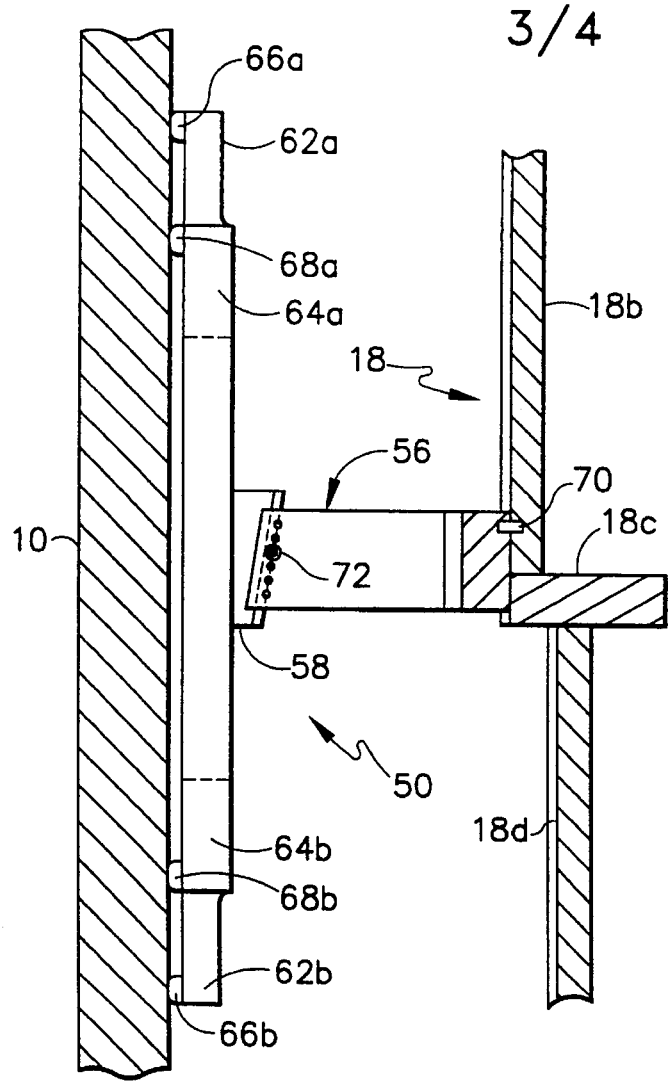
FIGS. 3A and 3B are side and top sectional views, respectively, of an installed shroud restraint stabilizer in accordance with a first preferred embodiment of the invention.
Figure 3B:
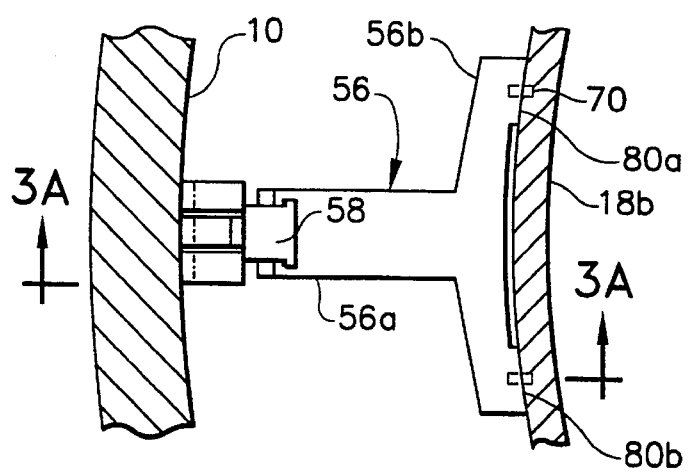

An installed shroud restraint stabilizer in accordance with the preferred embodiment is shown in FIGS. 3A and 3B. The stabilizer assembly 50 comprises a stabilizer spring assembly 54 and a wedge support 56. The stabilizer spring assembly 54 is in turn made up of a wedge 58, an intermediate support span 60 to which wedge 58 is bolted, and a plurality of leaf spring arms extending from each of the opposing ends of span 60.

The configuration of the as-assembled structure has been designed to assure that the assembly will self-locate in a stable manner. In particular, as described in detail below, means are provided to control the assembly in its six degrees of freedom.

Wedge support 56 is a generally T-shaped beam (see FIG. 3B) having a straight portion 56a extending radially outward from a curved portion 56b. The curved portion 56b is provided with two narrow-width flat pads 80a and 80b which extend the full height of the part at opposing ends thereof. Pads 80 bear on the outer circumferential surface of the shroud and distribute the local load on the shroud to the two contact areas. The wide base between the two contact areas provides stability against rotation about a vertical axis.

Threaded bores extend in parallel from the contact surfaces to a predetermined depth. Each threaded bore has a shear pin retainer 70 screwed therein. The shafts of shear pin retainers 70 extend in parallel into corresponding holes formed in the upper shroud wall 18b by electrodischarge machining (EDM) or any other suitable machining technique. The holes are machined parallel to the azimuth line on which the hole pattern is centered. Once inserted in the holes, the shear pin retainers 70 provide positive location of the wedge support 56 relative to the shroud, blocking vertical and circumferential displacements and rotation about a radial axis (i.e., the longitudinal axis of the installed wedge support).

In accordance with the installation procedure of the present invention, the wedge support 56 is lowered into position with the shear pin retainers 70 engaging the EDM holes in the upper shroud wall. Then the wedge support is clamped between the RPV and the shroud. The stabilizer spring assembly 54 is lowered into position and wedge 58 is slidably engaged with wedge support 56, as explained in detail below.

The wedge 58 and wedge support 56 have interlocking linear projections which allow the wedge to slide at a predetermined angle relative to the radial axis of the wedge support. This feature allows preload adjustment during installation. The stabilizer spring assembly 54 is gradually inserted into position by sliding the wedge 58 along the inclined end of the wedge support 56 until the stabilizer preload spring pads 66a and 66d bear against the inner circumferential surface of the reactor pressure vessel 10 with the desired preload.

When the desired preload is achieved, the wedge and wedge support are locked together. The wedge 58 has a row of spaced holes with a first pitch; the wedge support 56 has a row of spaced holes with a second pitch different than the first pitch. As the wedge and wedge support slide relative to each other, at least one hole on the wedge support overlies and is aligned with one hole on the wedge. The wedge and wedge support are locked together by inserting a wedge lock pin 72 into the aligned holes, thereby preventing mutual sliding. The wedge lock pin has a slotted and tapered leading end which compresses to enable the pin to enter and pass through the holes easily. The leading end is further provided with an enlarged feature which latches the pin in place after the enlarged feature clears the end of the hole and the slotted leading end resiliently expands to its uncompressed state. Thus, the stabilizer spring assembly 50 and the wedge support 56 are locked together to form an assembly which bridges the downcomer annulus.

Figure 4:
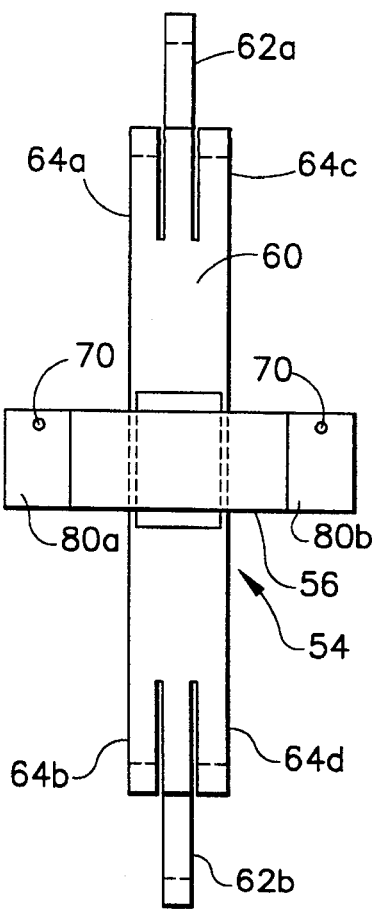
FIG. 4 is a front view of the shroud restraint stabilizer depicted in FIGS. 3A and 3B.

The stabilizer spring assembly 50 has multiple leaf springs for providing a reactive force which is a function of the amount of shroud lateral deflection. As best seen in FIG. 4, in a preferred embodiment one end of span 60 is integrally connected to and supports three leaf spring arms 62*a*, 64*a*, and 64*c*; the other end of span 60 is integrally connected to and supports three leaf spring arms 62*b*, 64*b*, and 64*d*. The span and springs are made of a high-strength alloy which is able to maintain its resilience in the reactor environment. For example, a nickel-chromium-iron alloy such as Inconel™ X750 or a Type XM19 stainless steel can be used.

Leaf spring arms 62*a* and 62*b* have a length greater than the length of leaf spring arms 64*a*–64*d*. A pad is integrally formed at the end of each leaf spring arm on the side facing the reactor pressure vessel wall 10. Leaf spring arms 62*a* and 62*b*, in conjunction with the intermediate support span 60, form a stabilizer preload spring. The distance between pads 66*a* and 66*b* on leaf spring arms 62*a* and 62*b* defines the base length of the stabilizer preload spring. The base length must be long enough to prevent rotation of the assembly about a horizontal axis perpendicular to the radial axis. Otherwise, the assembly could tip into a cocked position. Also the base must be sufficiently long to accommodate the differential in thermal expansion of the shroud and the reactor pressure vessel, thereby avoiding binding or overstressing of the components.

Leaf spring arms 64*a*–64*d*, in conjunction with the intermediate support span 60, form a seismic restraint spring. The distance between pads 68*a* and 68*b* on leaf spring arms 64*a* and 64*b* (which is equal to the distance between pads 68*c* and 68*d* on leaf spring arms 64*c* and 64*d*) defines the base length of the stabilizer preload spring.

The stabilizer spring assembly 54 is designed to flex elastically in response to a radially outwardly directed load being transmitted from the shroud 18 by the load-transmitting wedge support 56. The base length of the stabilizer preload spring is greater than the base length of the seismic restraint spring, contributing to the greater flexibility of the former. The stabilizer preload spring has sufficient stiffness to secure the stabilizer in place and absorb shroud annulus deformations with low preloads. During normal operation, the spring force exerted by the stabilizer preload spring provides restraint support for the shroud.

The heights of the pads are selected such that, after the stabilizer preload spring has been preloaded and under normal reactor operating conditions, the pads on the seismic restraint spring are in contact with the RPV wall, but are not preloaded. Instead, the seismic restraint spring is designed to become loaded only when the radially outward force exerted by a laterally deflecting shroud exceeds a predetermined support load. Such lateral deflection of the shroud might occur, e.g., during a seismic event.

Thus, below the predetermined support load, only the stabilizer preload spring opposes relative deflection of the shroud wall and RPV wall toward each other. When the load exerted on span 60 equals or exceeds the predetermined threshold load, both the stabilizer preload spring and the seismic restraint spring oppose the relative deflection of shroud 18 and RPV 10.

As can be seen in the side view of FIG. 3A, the ends of leaf spring arms 66*a* and 66*b* have a height less than the height of the ends of leaf spring arms 68*a*–68*d*, giving arms 68*a*–68*d* greater stiffness. Thus, the seismic restraint spring is both shorter and stiffer than the stabilizer preload spring. The seismic restraint spring can be designed to react to the high forces produced during a worst-case seismic event. The stiffness of the seismic restraint spring will vary depending on the frequency spectra of the particular plant's seismic design and other characteristics of the reactor system. The springs can be tuned to minimize seismic loads in the reactor.

Figure 5:
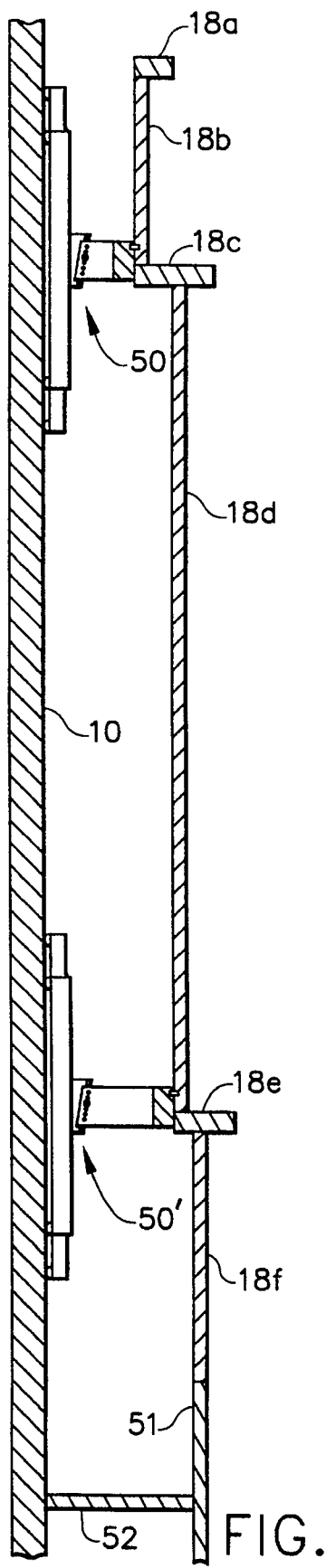
FIG. 5 is a side sectional view showing two shroud restraint stabilizers installed at different elevations in accordance with the first preferred embodiment of the invention.

In accordance with a preferred arrangement, six upper shroud restraint stabilizers 50 and twelve lower shroud restraint stabilizers 50' are installed at respective azimuthal positions distributed at angular intervals around the shroud circumference. As shown in FIG. 5, each upper stabilizer 50 is installed at the elevation of the top guide support ring 18*c*; and each lower stabilizer 50' is installed at the elevation of the core plate support ring 18*e*.

Figure 6:
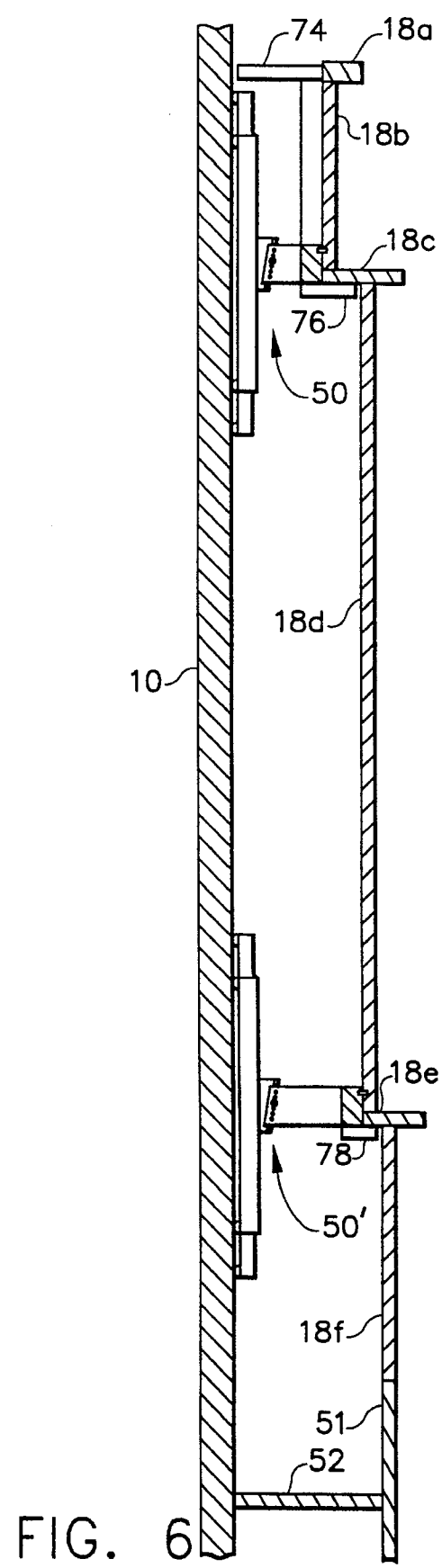
FIG. 6 is a side sectional view showing two shroud restraint stabilizers having limit stops and installed at different elevations in accordance with a second preferred embodiment of the invention.

An arrangement of stabilizers in accordance with another preferred embodiment is shown in part in FIG. 6. These stabilizers are identical to those depicted in FIG. 5 except for the addition of gross motion limit stops mounted on the stabilizers. Each upper stabilizer 50 has a limit stop 74 which allows normal lateral deflection of upper shroud wall 18*b*, but blocks gross lateral deflections that could, if left unchecked, cause damage to emergency core cooling system piping located outside upper shroud wall 18*b*. Each upper stabilizer 50 also has a limit stop 76 which blocks gross lateral deflection of the middle shroud wall 18*d* relative to the top guide support ring 18*c* in the event that the welds between top guide support ring 18*c* and middle shroud wall 18*d* become severed. If left unchecked, gross lateral deflection of middle shroud wall 18*d* could damage peripheral fuel assemblies in the fuel core. Finally, each lower stabilizer 50' has a limit stop 78 which blocks gross lateral deflection of the shroud support 51 relative to the core plate support ring 18*e* in the event that the welds between core plate support ring 18*e* and shroud support 51 become severed. Gross lateral deflection of shroud support 51 could, if not checked, cause damage to the control rod guide tubes located underneath the core. It should also be noted that limit stops 76 and 78, in cooperation with a shear pin retainer, block rotation of the assembly about a radial axis.

The preferred embodiments of the shroud restraint stabilizers in accordance with the invention have been disclosed for the purpose of illustration. Variations and modifications of the disclosed structures which do not depart from the concept of this invention will be readily apparent to persons skilled in the art of mechanical engineering. All such variations and modifications are intended to be encompassed by the claims set forth hereinafter.

I claim:

1. A nuclear reactor comprising a core shroud arranged inside a reactor pressure vessel with an annular space therebetween, said core shroud being secured relative to said reactor pressure vessel by a shroud support plate, and further comprising a plurality of shroud restraint stabilizers installed in said annular space at an elevation above said shroud support plate to limit lateral deflection of said shroud relative to said reactor pressure vessel, said plurality of shroud restraint stabilizers being circumferentially distributed at angular intervals around a circumference of said shroud, wherein each of said shroud restraint stabilizers comprises leaf spring means which bear against an inner circumferential surface of said reactor pressure vessel and beam means for transmitting a load from an outer circumferential surface of said shroud to said leaf spring means.

2. The nuclear reactor as defined in claim 1, wherein said leaf spring means comprise a stabilizer preload spring which is preloaded during installation and a seismic restraint spring which is not preloaded during installation.

3. The nuclear reactor as defined in claim 2, wherein said seismic restraint spring produces a resistance force opposing a lateral deflection of said shroud which is greater than the resistance force produced by said stabilizer preload spring in response to said lateral deflection.

4. The nuclear reactor as defined in claim 1, further comprising first and second slidable coupling means, said first slidable coupling means being connected to said leaf spring means and said second slidable coupling means being connected to said beam means, whereby said leaf spring means is slidable relative to said beam means and the length of said shroud restraint stabilizer changes during said relative sliding.

5. The nuclear reactor as defined in claim 4, further comprising means for locking said first and second slidable coupling means together to prevent said relative sliding.

6. The nuclear reactor as defined in claim 1, further comprising pin means for coupling said beam means to said shroud.

7. The nuclear reactor as defined in claim 2, wherein said leaf spring means comprises an elongated intermediate support span having first and second ends, first through third leaf spring arms extending in parallel from said first end of said intermediate support span in a first direction, and fourth through sixth leaf spring arms extending in parallel from said second end of said intermediate support span in a second direction opposite to said first direction, each of said leaf spring arms having a pad formed on a surface facing said inner circumferential surface of said reactor pressure vessel, said first through third leaf spring arms being respectively collinear with said fourth through sixth leaf spring arms, said first and third leaf spring arms being located on opposite sides of said second leaf spring arm and said fourth and sixth leaf spring arms being located on opposite sides of said fifth leaf spring arm, said pads on said second and fifth leaf spring arms being separated by a first distance, said pads on said first and fourth leaf spring arms being separated by a second distance less than said first distance, and said pads on said third and sixth leaf spring arms being separated by said second distance.

8. The nuclear reactor as defined in claim 1, wherein each of said shroud restraint stabilizers bears against a respective portion of said shroud and has a limit stop mounted thereon for blocking lateral deflection of said respective portion of said shroud beyond a preset amount.

9. A method for stabilizing a core shroud arranged inside a reactor pressure vessel with an annular space therebetween, said core shroud being secured relative to said reactor pressure vessel by a shroud support plate, comprising the steps of installing a plurality of spring devices between said core shroud and said reactor pressure vessel at an elevation above said shroud support plate, said spring devices being circumferentially distributed at angular intervals around a circumference of said core shroud such that each of said spring devices resists lateral deflection of said shroud relative to said reactor pressure vessel at its respective azimuthal location, wherein each of said spring devices comprises a stabilizer preload spring which is preloaded during installation and a seismic restraint spring which is not preloaded during installation.

10. The method as defined in claim 9, wherein said seismic restraint spring produces a resistance force opposing a lateral deflection of said shroud which is greater than the resistance force produced by said stabilizer preload spring in response to said lateral deflection.

11. The method as defined in claim 9, wherein said shroud comprises a top guide support ring and a core plate support ring, and said plurality of spring devices comprises a first set of spring devices arranged at the elevation of said top guide support ring and a second set of spring devices arranged at the elevation of said core plate support ring.

12. A nuclear reactor comprising:

a reactor pressure vessel having an inner circumferential surface;

a core shroud arranged inside said reactor pressure vessel with an annular space therebetween, said core shroud having an outer circumferential surface; and a first spring assembly arranged between and in abutment with said inner circumferential surface of said reactor pressure vessel and said outer circumferential surface of said core shroud, wherein said first spring assembly comprises a spring which flexes in response to deflection toward said reactor pressure vessel of a portion of said core shroud in a vicinity of said first spring assembly, and a load-transmitting member which abuts said outer circumferential surface of said core shroud at first and second azimuthal positions, and said spring abuts said inner circumferential surface of said reactor pressure vessel at a third azimuthal position disposed between said first and second azimuthal positions.

13. A nuclear reactor comprising:

a reactor pressure vessel having an inner circumferential surface;

a core shroud arranged inside said reactor pressure vessel with an annular space therebetween, said core shroud having an outer circumferential surface; and a first spring assembly arranged between and in abutment with said inner circumferential surface of said reactor pressure vessel and said outer circumferential surface of said core shroud, wherein said first spring assembly comprises a leaf spring which flexes in response to deflection toward said reactor pressure vessel of a portion of said core shroud in a vicinity of said first spring assembly, and said leaf spring comprises a first leaf spring arm which abuts said inner circumferential surface of said reactor pressure vessel at a first location having a first elevation and a first azimuthal position and a second leaf spring arm which abuts said inner circumferential surface of said reactor pressure vessel at a second location having a second elevation and said first azimuthal position.

14. The nuclear reactor as defined in claim 13, wherein said leaf spring comprises a third leaf spring arm which abuts said inner circumferential surface of said reactor pressure vessel at a third location having a third elevation and a second azimuthal position and a fourth leaf spring arm which abuts said inner circumferential surface of said reactor pressure vessel at a fourth location having a fourth elevation and said second azimuthal position, wherein said first and second locations are separated by a first distance greater than a second distance separating said third and fourth locations.

15. The nuclear reactor as defined in claim 12, wherein said first spring assembly further comprises first and second slidable coupling members, said first slidable coupling member being connected to said spring and said second slidable coupling member being connected to said load-transmitting member, whereby said spring is slidable relative to said load-transmitting member and the length of said first spring assembly varies during said relative sliding.

16. The nuclear reactor as defined in claim 15, wherein said first spring assembly further comprises a locking element which engages said first and second slidable coupling members to prevent relative sliding thereof.

17. The nuclear reactor as defined in claim 12, further comprising a pin for coupling said load-transmitting member to said core shroud.

18. A nuclear reactor comprising:

a reactor pressure vessel having an inner circumferential surface;

a core shroud arranged inside said reactor pressure vessel with an annular space therebetween, said core shroud having an outer circumferential surface; and a first spring assembly arranged between and in abutment with said inner circumferential surface of said reactor pressure vessel and said outer circumferential surface of said core shroud, said first spring assembly comprising a spring which flexes in response to deflection toward said reactor pressure vessel of a portion of said core shroud in a vicinity of said first spring assembly; and a limit stop supported by said first spring assembly, said limit stop blocking deflection toward said reactor pressure vessel beyond a predetermined distance of said portion of said core shroud in a vicinity of said first spring assembly.

* * * * *